United States Patent
Martens et al.

(10) Patent No.: US 6,252,974 B1
(45) Date of Patent: Jun. 26, 2001

(54) METHOD AND APPARATUS FOR DEPTH MODELLING AND PROVIDING DEPTH INFORMATION OF MOVING OBJECTS

(75) Inventors: Harald Aagaard Martens, Munich; Jan Otto Reberg, Unterföhring, both of (DE)

(73) Assignee: IDT International Digital Technologies Deutschland GmbH, Ismaning (DE)

(*) Notice: Subject to any disclaimer, the term of this patent is extended or adjusted under 35 U.S.C. 154(b) by 0 days.

(21) Appl. No.: 08/930,339
(22) PCT Filed: Mar. 22, 1996
(86) PCT No.: PCT/EP96/01269
  § 371 Date: Mar. 6, 1998
  § 102(e) Date: Mar. 6, 1998
(87) PCT Pub. No.: WO96/29678
  PCT Pub. Date: Sep. 26, 1996

(30) Foreign Application Priority Data

Mar. 22, 1995 (EP) .................................. 95104227

(51) Int. Cl.$^7$ .................................. G06K 9/00
(52) U.S. Cl. .................. 382/107; 345/422; 382/154; 382/236
(58) Field of Search .................. 382/100, 103, 382/104, 108, 154, 181, 190, 236, 201, 256, 107, 285; 345/427, 433, 473; 434/247, 262; 348/43

(56) References Cited

U.S. PATENT DOCUMENTS 5,611,000 * 3/1997 Szeliski et al. ................. 382/294
5,751,927 * 5/1998 Wason ................. 345/419
5,764,871 * 6/1998 Fogel ................. 345/427
5,846,086 * 12/1998 Bizzi et al. .

OTHER PUBLICATIONS

International Journal of Computer Vision, vol. 9, No. 2, Nov. 1992, pp. 137–154, Carlo Tomasi et al.: "Shape and motion from image streams under orthography:a factorization method".
G. Strang: "Introduction to Linear Algerbra"; Wellesley–Cambridge Press, 1993, pp. 337–348.

* cited by examiner

Primary Examiner—Jay Patel
(74) Attorney, Agent, or Firm—Darby & Darby

(57) ABSTRACT

A method and apparatus for indirect quantitative assessment or determination and modelling of the depth dimension of moving objects in signal streams where the depth information is not directly avaible, but where occlusion information can be derived. For this the method for estimating depth in an image sequence consisting of at least two frames comprises the steps of (1) selecting and characterizing recognizable points, (2) examining for each point in each frame whether it is visible or occluded, collecting this occlusion data in an occlusion list such that each frame corresponds to one row in the list and each point corresponds to a column in the list, such that elements in the list corresponding to visible points are given large, values and elements in the list corresponding to occluded points are given small values, (3) performing a Principal Component Analysis on the occlusion list, resulting in column vectors called score vectors and row vectors called loading vectors, the collection of one score vector with a value for each frame and one loading vector with a value for each point being called a factor, and (4) outputting the numerical value of each element of the loading vector of the first factor as depth information on the corresponding point, where a large numerical value indicates a point close to the camera or observer and a small numerical value indicates a point farther away.

11 Claims, 12 Drawing Sheets o = Estimated scores x = Predicted and interpolated scores

| Points, seen from above | Points, seen from camera | Local occlusion | Occlusion list representation | | | | Scores | Predicted scores | Predicted depth | | | |
|---|---|---|---|---|---|---|---|---|---|---|---|---|
| | | | a | b | c | d | | | a | b | c | d |
| a b / c d (310, 312) | a b c d | | ? | ? | ? | ? | ? | -3.7 | -1.9 | -1.9 | 1.9 | 1.9 |
| a b / c d | a c d | c>b | ? | -1 | 1 | ? | -2.0 | -2.7 | -1.4 | -1.4 | 1.4 | 1.4 |
| a b / c d | c d | c>a, d>b | -1 | -1 | 1 | 1 | -2.0 | -1.8 | -0.9 | -0.9 | 0.9 | 0.9 |
| a b / c d | c d b | d>a | -1 | ? | ? | 1 | -2.0 | -0.8 | -0.4 | -0.4 | 0.4 | 0.4 |
| c d a b | c d a b | | 1 | ? | ? | ? | ? | 0.2 | 0.1 | 0.1 | 0.1 | -0.1 |
| c d / a b | a b | a>d | 1 | 1 | ? | -1 | 2.0 | 1.2 | 0.6 | 0.6 | -0.6 | -0.6 |
| c d / a b | c a b | a>c, b>d | ? | ? | -1 | -1 | 2.0 | 2.1 | 1.1 | 1.1 | -1.1 | -1.1 |
| c d / a b | a b c d | | ? | ? | ? | ? | ? | 3.1 | 1.6 | 1.6 | -1.6 | -1.6 |

Loading = | 0.5 | 0.5 | -0.5 | -0.5 |

Fig. 3

| Frame | Visible points |
|---|---|
| 1 | a b c d e |
| 2 |   b c d e f |
| 3 |     c d e f g |
| 4 |       d e f g h |
| 5 | a       e f g h |
| 6 | a b       f g h |
| 7 | a b c     g h |

| Frame | a | b | c | d | e | f | g | h | a | b | c | d | e | f | g | h |
|---|---|---|---|---|---|---|---|---|---|---|---|---|---|---|---|---|
| 1 | 1 | 1 | 1 | 1 | 1 | -1 | -1 | -1 | (50) | 71 | 0 | -71 | -100 | ? | ? | ? |
| 2 | -1 | 1 | 1 | 1 | 1 | 1 | -1 | -1 | ? | 100 | 71 | 0 | -71 | -100 | ? | ? |
| 3 | -1 | -1 | 1 | (-1) | 1 | 1 | 1 | -1 | ? | ? | 100 | (?) | 0 | -71 | -100 | ? |
| 4 | -1 | -1 | -1 | -1 | 1 | 1 | 1 | 1 | ? | ? | ? | 100 | 71 | 0 | -71 | -100 |
| 5 | -1 | -1 | -1 | -1 | 1 | 1 | 1 | 1 | -100 | ? | ? | ? | 100 | 71 | 0 | -71 |
| 6 | 1 | -1 | -1 | -1 | -1 | 1 | 1 | 1 | -71 | -100 | ? | ? | ? | 100 | 71 | 0 |
| 7 | 1 | 1 | -1 | -1 | (1) | -1 | 1 | 1 | 0 | -71 | -100 | ? | (0) | ? | 100 | 71 |

| | |
|---|---|
| 114.8 | -125.1 |
| 199.4 | -2.5 |
| 153.1 | 126.7 |
| 23.7 | 196.0 |
| -125.5 | 166.7 |
| -198.8 | 37.3 |
| -153.6 | -124.5 |

Reconstructed horizontal position and depth for frame 1

Camera position

C>A ∧ C>B

A>C ∨ B>C

No conclusion

A>B

A>B
B>C

A>B
A>C
B>C

A>B
B>C
C>A

B>D
D>C
B>A
A>C

METHOD AND APPARATUS FOR DEPTH MODELLING AND PROVIDING DEPTH INFORMATION OF MOVING OBJECTS

FIELD OF THE INVENTION

The present invention relates to a method and apparatus for indirect quantitative assessment or determination and modelling of the depth dimension of moving objects in signal streams where the depth information is not directly available, but where occlusion information can be derived. One example of such data is digital video sequences of moving objects from 1D or 2D cameras.

BACKGROUND OF THE INVENTION

In contrast to ranging instruments such as radar, video cameras do not directly yield the depth or distance from measuring device to the objects observed. Only vertical and horizontal positions and movements are observed directly. When optically dense objects move behind each other, the resulting occlusions are observed as loss of signal from the hidden objects.

However, for some video modelling and compression schemes it is important to have compact representations of the depth dimension. Depth is here defined to be position along line of sight from camera or observer.

Depth information is wanted in most object based video compression systems. One usage is efficient handling of overlapping objects. An encoder can use depth order information to assign image parts to correct objects, and a decoder can use this information so that only the frontmost object is displayed in case of overlaps. Such depth modelling could be called ordinal or qualitative depth modelling.

Another group of video modelling systems where depth is important is automatic map construction systems, where a map is automatically made based on terrain photographs made from different positions. e.g. from a plane travelling over the terrain. Here a depth, or height, model with numeric values for each terrain point can be computed, according to the theory of stereogrammetry. When there are steep mountains in the terrain, this may give rise to occlusions for some of the frames in the sequence. Such occlusion may pose a problem for some of the existing methods, while they will be a source for information in a system according to this invention. Such depth modelling could be called quantitative depth modelling.

For another example of an object based video modelling system, consider a garbage sorting system consisting of a camera and a robot arm mounted next to a conveyor belt. Some types of cameras, especially operating in parts of the near infrared spectrum, are good at recognizing different types of materials, e.g. plastics, and results from such analysis could then be used to control a robot arm which could grab the objects from the conveyor belt and release them into sorting bins. It could then be important that the robot arm only tries to grab the objects that do not lie partly behind other objects. Analysis of the camera images according to the present invention could then be performed, so that a depth graph is obtained, giving information on which objects occlude other objects. Such depth modelling could be called depth graph modelling.

For yet another example of an object based video modelling system, consider a video-based system for automatically steering a driving car. Other cars, and the terrain around, may occlude each other. It is then interesting to know not only which objects occlude each other, but also how fast they move, how fast they accelerate, and how they will occlude each other in the near future. Such information can according to this invention be summarized in a bilinear model consisting of one spatial and one temporal part.

In some video modelling techniques it is also advantageous to be able to determine and represent temporal changes in the depth dimension. Present video codec (encoder/decoder) systems do not yield sufficient descriptions of systematic temporal changes in the depth dimension.

This invention only relies on occlusions, that is, information about which points or areas can be followed through which frames. It does not need depth clues that demands "understanding" of the scene. Such clues could have been that mountains that appear to be blue (for a camera or observer) are often farther away than mountains that appear to be green, objects that are close to the horizon are often farther away than objects that are far away from the horizon, a face that seems small is often farther away than a face that seems large, a thing that seems to move fast is often closer than a thing that seems to stand still, or that a thing that is in camera focus has another depth than a thing that is outside camera focus. It also does not use stereo vision or other types of parallax. However. if any such side information is available, it can be included to further stabilize the estimation.

Accordingly, it is an object of the present invention to provide a method and apparatus for deriving ordinal or qualitative depth information from spatially resolved signals (the input signals) in general, and from video sequence image data from 1D or from 2D cameras in particular.

It is also an object of the present invention to detect temporal or spatial inconsistencies in depth order, and then either resolve these inconsistencies or model them compactly.

Yet another object is to yield quantitative depth information for different parts of the image and to output the depth information in any form.

Yet a further object is to yield quantitative information about how the depths in different parts of the frames change with time and to output the depth information in any form.

Yet a further object is to represent the depth information in a compact model representation.

Yet a further object is to enable temporal and spatial interpolation and extrapolation on the basis of this compact model representation.

Yet a further object is to estimate depth with sufficient quantitative detail for a sequence such that the frames in the sequence can be well decoded or reconstructed, but without having to find the "true" depth.

Yet a further object is to convert qualitiative occlusion data, at the nominal or ordinal measurement levels, to depth predictions, at the ratio or interval measurement level.

SUMMARY OF THE INVENTION

The analysis of depth is performed in two main stages: First, a number of simple local occlusions are detected and characterized. Secondly, these occlusions are analyzed jointly by robust analysis to denve a common depth model.

The local occlusions can be be found using feature point search, reverse motion estimation, hypothesis testing, or other techniques that yield information on which parts of images are occluded or are occluding other parts.

The joint analysis of occlusions can be made using techniques known to the expert such as robust multivariate modelling, robust topological sorting, or a combination of both. The multivahate modelling works better for changing depth orders, and can also utilize image geometry data, while the topological sorting produces a depth graph that is useful in many applications. The topological sorting can be used as one step of the multivariate modelling.

In the joint analysis, a preliminary depth model can be found and inconsistencies between the local occlusions can be detected. This information can then be fed back to the local occlusion detection for repeated local occlusion analysis. A new depth model can be be made, and this procedure can be repeated until convergence.

The resulting common depth model can be of four types: First, it can be one ordinal depth order for the involved parts of the images. Second, it can be quantified depth for the involved parts of the image. Third, in can be a bilinear model, consisting of one spatial part, called "loadings", that represent a low number of spatial depth change patterns, and a temporal part, called "scores", that represent how much of each spatial depth change pattern that is present for each frame. Fourth, it can be an occlusion graph (also called "depth graph"), indicating which parts of the image occludes other parts. The four types can be combined. In particular, a combination of a quantified depth and a compatible occlusion graph can be found.

The multivanate depth model has spatial and temporal parameters from which it is possible to predict the depth of picture elements and points in time where they are occluded, or points in time for which no occlusion information is available. These interpolations and extrapolations can be based on assumptions about local spatial or temporal smoothness, and can give useful range information.

If objects in the observed scene change depth relative to each other, or if objects rotate, this may cause systematically varying local occlusion patterns. The multivariate depth model can be made to accomodate such systematic depth changes with a limited increase in model complexity.

If reliable estimates are available for motions in the image plane for the visible parts of the images, this information can be used to stabilize and enhance the depth modelling. Also estimates of depth, or estimates of motion perpendicular to the image plane can be used to stabilize and enhance the depth modelling.

The flexibility of this modelling approach makes the method suitable for automatic analysis of unknown video sequences.

BRIEF DESCRIPTION OF THE DRAWINGS

FIG. 3 illustrates how temporal modelling can be included;

FIRST PREFFERED EMBODIMENT

Figure 1:
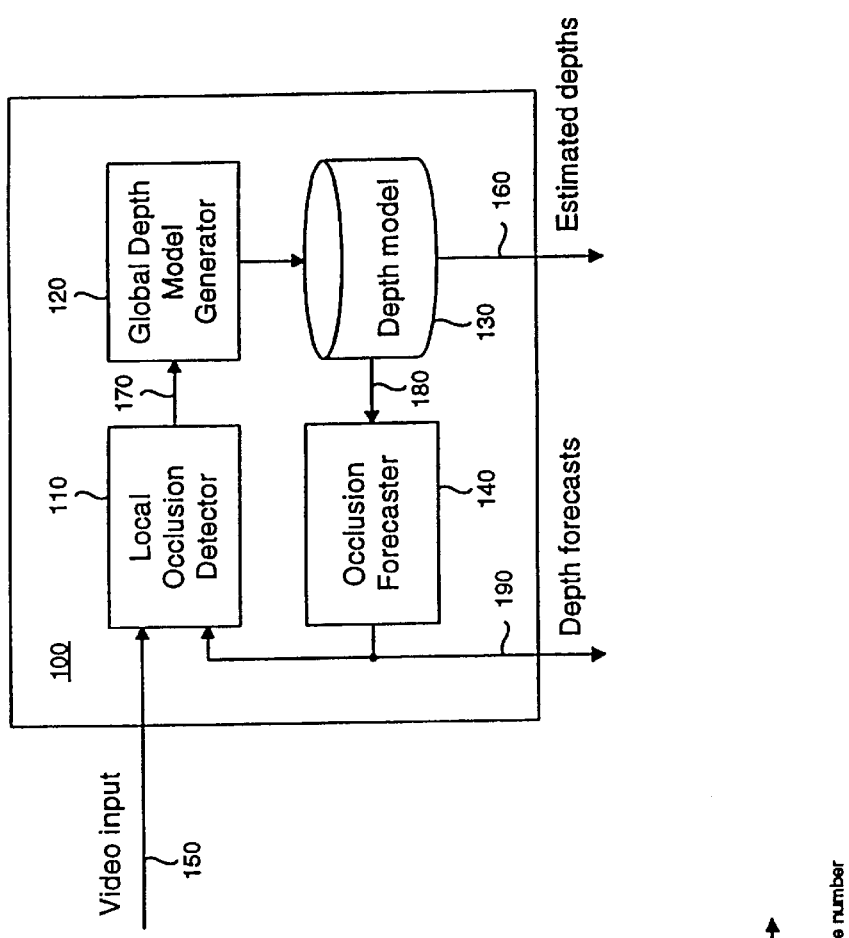
FIG. 1 outlines the two main operators of the invention, the Local Occlusion Detector and the Global Depth Model Generator.

FIG. 1 shows an overview over this invention in its first preferred embodiment, consisting of a Depth Modeller 100 containing a Local Occlusion Detector 110, a Global Depth Model Generator 120, an Occlusion Forecaster 140, and a depth model 130. The Local Occlusion Detector 110 receives video input 150 and analyzes the frames of the video input for local occlusion patterns, while the Global Depth Model Generator 120 combines information about the local occlusion patterns into a depth model 130. Based on the depth model 130, estimated depths 160 are output. The depth model 130 is also used to forecast occlusions in the Occlusion Forecaster 140. The results can be output as depth forecasts 190. They may also be fed back to improve the performance of the Local Occlusion Detector 110.

The usage of the output from the Depth Modeller 100 for decoding (reconstructing of frames) is explained in WO 95/34127, which is hereby included by reference.

The cooperation between the Local Occlusion Detector 110 and the Global Depth Model Generator 120 will now be explained with reference to FIG. 2.

In the following, illustrations of the invention will be given for simple 1D (one-dimensional) cases, as would be produced by a horizontal line camera. Though experts in the field will see that that the method generalizes directly to 2D camera data, at some points explicit instructions for how to apply the data to 2D data will also be given.

Figure 2:
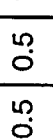
FIG. 2 shows for 1D camera data a simple case of one object moving behind another object.

The leftmost column 205 of FIG. 2 shows the configuration of points, including their true depths. It indicates two objects, ab 210 and cd 212. Each row of FIG. 2 corresponds to one observation of occlusions, corresponding to one video frame. Object ab 210 has two recognizable points, a 214 and b 216, while object cd 212 has two recognizable points c 218 and d 220. The objects, with points, are seen from above, with a camera position 222 in front indicated.

The second column 225 illustrates what the camera 222 observes. The two objects 210, 212 are both fully visible in the first frame.

The Local Occlusion Detector 110 is based on a a Feature Point Detector. The Local Occlusion Detector 110 works by maintaining a list of feature points appearing in the sequence, and detecting when each feature point is visible.

A feature point can be any recognizable part of an image. One possibility is to base feature points on geometrical primitives like coners, as described in "Corner Detection Using Laplacian of Gaussian Operator", S. Tabbone, "Proceedings of The 8th Scandinavian Conference on Image Analysis", 1993, which is hereby included by reference.

The function of the Local Occlusion Detector 110 can be summarized by the following pseudocode:

Initialize FeaturePointList to empty

For each Frame:

Repeat so long as a new FeaturePoint can be found in Frame:

Search for an entry in FeaturePointList that matches
FeaturePoint
If the match was not successful:
Include the new FeaturePoint in the FeaturePointList
Mark the FeaturePoint as Found for this Frame
For each frame:
For each FeaturePoint in the FeaturePointList:
Output FeaturePoint index
If the FeaturePoint was Found for this Frame:
Output Found
else
Output NotFound According to this pseudo-code, the system will build a list over feature points. Each point must be characterized so that it is later uniquely recognizable. One method is to use characteristics like size or orientation. A second method is to include relations to other feature points, so that when a feature point found in a frame is searched for in the feature point list, it must also have an acceptable position relative to other feature points before a match with a feature point in the feature point list is accepted. A third method is to store a region of pixels frame around the feature point, collected from a reference. These three methods can be combined. Such characterization is part of the feature point list.

The output from the Local Occlusion Detector 110 will thus be a list of feature points indices, together with a Found or NotFound label for each feature point.

In this preferred embodiment, feature points that are not found are regarded as being occluded. There are, however, two other cases that could be considered.

The first is that feature points may change status from Found to NotFound or vice versa because of changes in objects in the frame. As an example, consider a wrinkle in a face: First the wrinkle may be visible, and thus is collected as a feature point. Then the skin may be stretched, so that the wrinkle is not more visible, though it is not being occluded. One method to overcome some such problems is to assume that occlusions are normally sudden events, while appearance or disappearance of feature points as exemplified by the wrinkle normally happens over some time. It is therefore possible to compute a confidence estimate for the feature point. having a high value when it is very certain that the feature point is present and a low value when it is very certain that it is not present, and only mark the feature point as Found or NotFound when the confidence estimate changes suddenly and with a significant amount. In other cases, it can be marked as Neutral.

The second case is that feature points may move out from or into the frame. For depth estimation, it is essential to differ between a feature point becoming invisible because it is occluding and the feature point becoming invisible because the camera is pointed in another direction. For discriminating between these two cases, a Local Occlusion Detector 110 that uses motion estimation is practical. Such a Local Occlusion Detector will be described below; assume for now that the nature of the application is so that this is not a problem.

According to the pseudo code above, the sequence is traversed two times, according to the two different for-loops over frames. Another possibility is to combine these into one, in which case the feature point list may grow, or even shrink, as new feature points are found or otherwise analyzed. The Global Depth Model Generator 120 must then be able to handle such a dynamic, updated data structure, or the Local Occlusion Detector 110 must format its data so that this change in size is not visible to the Global Depth Model Generator 120. One simple method for the latter is to preallocate the size of the feature point list to accomodate a fixed maximum number of feature points, and fill the positions corresponding to feature points that are not defined at a given time with zeros. Alternatively, missing values can be used: the use of missing values will be described below.

The above type of representation includes, as a special case, the representation of video as layers as described in "Layered representation for image sequence coding", J. Y. A. Wang and E. H. Adelson, pp. 221–224, IEEE ICASSP, Vol. 5, Minneapolis, Minn., 1993, which is hereby included by reference. There, the feature points are the recognizable pixels, and the feature point list is the collection of layers.

The local occlusion data are in this first preferred embodiment stored as one entry per frame in an Occlusion List 230, illustrated in the third column 235. The Occlusion List 230 has one column for each point. For each frame, each point has a corresponding entry in the Occlusion List 230, and in this first preferred embodiment the entry is +1 for visible points and −1 for points that are not visible in the given frame. For the first frame, all points are visible, so the value +1 appears four times in the Occlusion List 230. Points marked Neutral can be given the value 0.

The choice of the values of +1 and −1 is not critical. The values used must indicate an ordering, but apart from this limitation, many choices of values are possible. One possibility is to let statistically certain observations have large positive or negative values, while uncertain observations are given smaller values.

The choice of +1 for visible and −1 for not visible points implies, as will be seen later, a depth scale where a large positive value corresponds to a point near the observer.

For the second frame, the second row indicates that the object ab 214, 216 has now moved partly behind object cd 218,220, so that point b 216 is hidden from the camera.

Further frames of the video, with corresponding local occlusion data, are shown in rows 3 to 5.

The Occlusion List 230 is the basis for the Global Depth Model Generator 120. In this first preferred embodiment, the Global Depth Model Generator is implemented using bilinear modelling based on uncentered Principal Component Analysis (PCA). PCA is described in Martens & Naes (1989): Multivanate Calibration. J. Wiley & Sons Ltd., Chichester UK, which is hereby included by reference. All the numerical PCA results used in the examples are derived using the function "mdpca" of "PLS_Toolbox for use with Matlab" by Barry M. Wise (1994), Eigenvector technologies, 4145 Laurel Drive, West Richland, Wash. 99352 USA, which is hereby included by reference.

On the data set illustrated in the Occlusion List 230, the mean value of all the frames was Mean depth =[0.2 0.2 1 1]. This is the simplest way of estimating depth over several frames, and may be sufficient for the present simple case. It is assumed that the depth is the same for all the frames.

A more flexible depth estimation is attained using Principal Component Analysis, whereby the depth is not assumed to be the same for all frames. In this first example the Principal Component model produced reasonably good fit using one Principal Component. "Loadings" 240 of this Principal Component represent spatial information, while "scores" represent temporal information. The collection of one score vector with a value for each frame and one loading vector with a value for each point is called a "factor". The factor has loading [0.27 0.27 .65 .65] for points a,b,c and d, respectively, indicating that points a and b were similar and points c and d were similar with respect to depth, such that the available occlusion data give no clue to a depth difference between a and b or c and d. Multiplying scores by loadings, the depth can be estimated for each frame, as shown in the estimated depth list. For each frame, points c and d have higher estimated values for the depths than a and b, indicating that points c and d were closer to the camera or observer. Although not necessarily the same as the "true" physical depth, the values do indeed reflect a set of depths that is compatible with what the camera observes.

In FIG. 3, the example from FIG. 2 is made more complicated in that the object ab 310 is not only moving sidewise, but also changing its depth (distance to camera) so that in some frames it is behind object cd 312, in some frames is in front of it.

Also another type of Local Occlusion Detector 110 is assumed. Instead of only distinguishing between visible and not visible points, as described in the explanation of FIG. 2, when a point is occluded the Local Occlusion Detector 110 can also indicate which point was occluding it. Such a Local Occlusion Detector can be made using motion estimation. One example is to follow regions of images over several frames, as done in "Wang & Adelson", already mentioned above. When an occlusion occurs, as judged from motion extrapolated in time, space or both, the frontmost, or occluding, point is found by hypothesis testing, and the other points must then be occluded points. When a point, according to the extrapolated motion, is estimated to move outside the camera view, it is marked as Neutral, and is represented as a missing value in the Occlusion List.

Another example of such a Local Occlusion Detector based an motion estimation is the method given in "Obtaining a Coherent Motion Field for Motion-Based Segmentation", D. P. Elias and K. K. Pang, "Proceedings of International Picture Coding Symposium", 1996, Melbourne, Australia, which is hereby included by reference.

Occluding points are now represented in the Occlusion List as +1, occluded points by −1, and points that are not involved in occlusions are marked as missing values, shown by question marks in the FIG. 3.

In FIG. 3, the third column lists which local occlusions can be estimated from the frames, and the Occlusion List 330 directly reflect these local occlusions, with the notation "A>B" used for indicating that A is in front of B.

Each occlusion observation could have been given one row in the Occlusion List 330. For example, for the third frame, the local occlusion c>a could have been represented as [−1 ? 1 ? ] and d>b as [? −1 ? 1].

Alternatively, the occlusions for one frame can be combined together, such that c>a and d>b are represented as one entry in the Occlusion List 330, namely [−1 −1 1 1].

Representing each occlusion observation as one row has the advantage of normally producing better result, since the available occlusion data are more directly represented in the Occlusion List. Representing all occlusions observations for one frame together as one row has the advantage of a simpler relation between frames and bilinear model. To simplify the description, only the latter method is illustrated here.

In this case the mean of the occlusion list over all the frames does not give meaningful depth estimates.

The method to be used for computing the Principal Components must now be able to handle input data sets containing missing values. The function mentioned earlier, "mdpca", indeed has this ability, as described in the Manual for "PLS_Toolbox for use with Matlab" by Barry M. Wise (1994) referenced above. One way to handle missing values is as follows: A Principal Component model is calculated using weight zero for the missing values, and the missing values that are least consistent with the model are replaced.

A new principal component model is then computed, and the process is repeated until the estimates of the missing data converge.

The missing value estimation as well as the depth modelling is done with as few bilinear factors in the model as possible while giving acceptable conformance to the observed local simple occlusion data. The dimension of the bilinear model can be determined by standard methods, e.g. by cross validation.

For the first and last frame, no scores can be found, since there are no local occlusions available for these frames. This is valuable output for some applications, since it signifies that any depth order is allowable for these frames. For the other frames, no change in scores appears, indicating that there is no change in depth during the sequence.

Again a one-factor bi-linear model was found to give adequate fit to the simple occlusion hypotheses. The found loading 340, with values [−0.5 −0.5 0.5 0.5], again has the property that the depth of point a cannot be distinguised from b, just like the depth of point c cannot be distinguised from point d. However, now its scores varied from frame to frame, indicating changes in the depth from frame to frame: Its score was −2 from frames 2,3 and 4, and +2 for frames 6 and 7.

Figure 4:
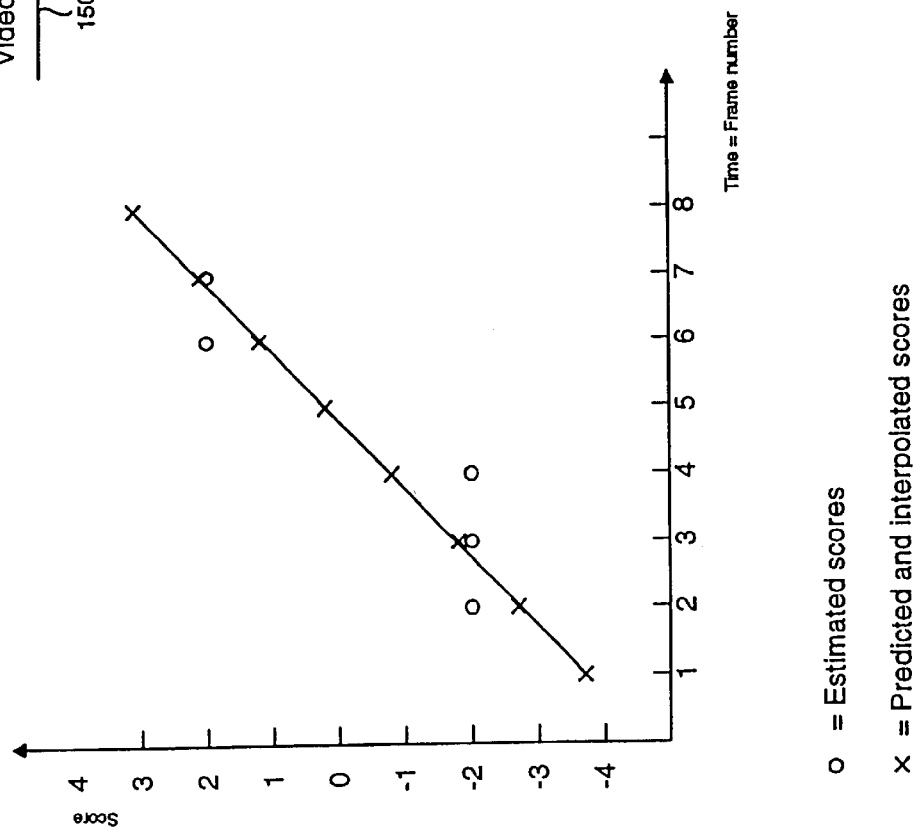
FIG. 4 is a plot of results according to the data of FIG. 3.

In this example, it is assumed that is that there are systematic variations over time. This means that for those frames where no occlusion is available, temporal interpolations or extrapolations based on nearby frames can be used. This is illustrated in FIG. 4. The scores, found using the method as explained for FIG. 2 and shown in a column in FIG. 3, are plotted as circles as function of frame number in FIG. 4. Observe that no circles for frames 1, 5 and 8 are given. Based on these data, a least squares regression can be computed as indicated by the line with crosses, which now includes frames 1, 5 and 8.

The result of the analysis illustrated in FIG. 4 is included in the column for predicted scores in FIG. 3. When multiplying these predicted scores by the loading 340, then a predicted depth 350 is found. Again, although not corresponding directly to physical depth, the resulting predicted depths are consistent with the data observed by the camera.

Thus, in this example a varying depth was modelled quantitatively. Depth information was predicted for frames in which no occlusion information was available, using temporal continuity assumptions instead.

Instead of the least squares regression, other types of interpolations or extrapolations in time could have been used to fill in for the missing score values. In particular, a missing score can be replaced by an average, a median, or a weighted average of scores for near frames. The result can then be processed using low-pass filtering, median filtering, autoregressive moving average (ARMA) filters, piecewise polynomials (splines) or similar.

Although not illustrated, filling of missing values can also be used on the loadings. When a missing value is observed for an element of a loading, it signifies that no occlusion has been observed for the corresponding point. For many applications, it is then reasonable to fill the element based on nearby values. For line camera applications, it can be done by the same techniques as discussed above for scores. For normal cameras producing 2-dimensional images, this can be done e.g. by weighted sums of neighbours.

Figure 5:
FIG. 5 shows for 1D camera an example of a motion pattem, namely a rotating body, that is best modelled by a two-factor bilinear depth model.

In some cases, a Principal Component representation based on one factor only is not sufficient to represent changing depth. This is illustrated in FIG. 5, where a rigid body is rotating. The occlusion data are shown in columns 1–3 in FIG. 5. A one-factor bilinear model did not give adequate fit to these data, while a two-factor model did; thus the model was chosen to be two-dimensional. The scores for the frames for the two factors are given in columns 8 and 9, and the bottom two rows show the corresponding loadings for points a, b and c.

Multiplying the score by the loading for each of the two factors and summing the products yielded the estimated depth data shown in columns 10–12 for points a, b and c. An intermediate depth (0) has been estimated for those points where no occlusion information was observed.

This illustrates that a bilinear motion model with more than one factor dimension can handle depth variations due to rotations.

By allowing more than one factor into the model, the bilinear modelling, due to its nature as a series expansion approximation method, can also be used to model more complex depth, changes, such as the motions of non-rigid bodies as well. This can be done exactly as already described. Only the human interpretation of the final results may change. Modelling of non-rigid bodies and other more complex depth changes is therefore not illustrated here.

Other data than occlusions may be used to enhance the depth modelling. In one preferred embodiment estimates of motions perpendicular to the depth dimension is analyzed together with the simple local occlusion data. This will be illustrated in FIG. 6a–f.

In FIG. 6a, a wheel is rotating towards the camera. There are eight discernible points on the wheel, points a, b, c, d, e, f, g and h situated 45 degrees from each other around the periphery of the wheel. Their occlusion patterns have (for simplicity) been observed at seven points in time, with 45 degrees difference in rotation between each point in time.

Figures 6, 6B:
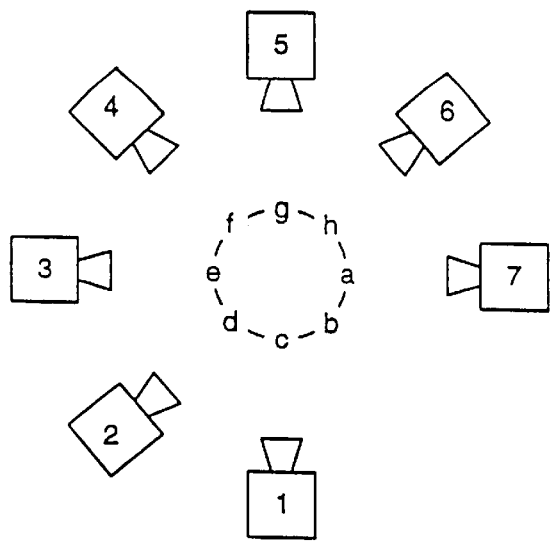
FIG. 6 a through f together show how the modelling of depth can be enhanced with image geometry data, thereby giving better quantitative data; the figures also illustrate that the method is robust to minor errors in the input data.

FIG. 6b lists which points are visible in each frame.

FIG. 6c shows the Occlusion List. augmented with auxiliary information.

In this example, horizontal motion information represents available auxiliary information. For simplicity, a parallel projection camera modell has been assumed, as opposed to the more normal pinhole camera modell. Setting the radius of the weel arbitrarily to 100, the rightmost part of FIG. 6c then indicates the horizontal position of each point in each frame. The horizontal position of the visible points are given in columns 9–16 of FIG. 6c. Implicitly these horizontal position data reflect the horizontal motions as the wheel rotates.

Note that some data not consistent with the figure in FIG. 6a have been inserted in FIG. 6c. Point d, which should be visible in frame 3, has been marked as not visible in that frame. Point e, which should be not visible in frame 7, has been marked as visible in that frame. Finally, the horizontal position of point a has been represented as 50 instead of 100. This data, that could represent errors in the local occlusion detector, have been inserted to demonstrate that the system is robust to reasonable amounts of errors and noise in the input data.

A two-factor for the bilinear model was selected here, analogously to the rotating body in FIG. 5. The loadings are given in FIG. 6d, the scores in FIG. 6e, and the scores and loadings have been multiplied to give reconstruction of the depth in FIG. 6f.

Both the qualitative occlusion data and the quantiative auxiliary horizontal position data are modelled together in the Multivariate Depth Model Generator. In order to ensure that the horizontal position data properly affect the multivarate total least squares (joint principal component) model, they have been scaled down by a factor 100. Alternatively, PLS2 regression might here have been used (Martens & Naes 1989 already mentioned above).

Figure 7:
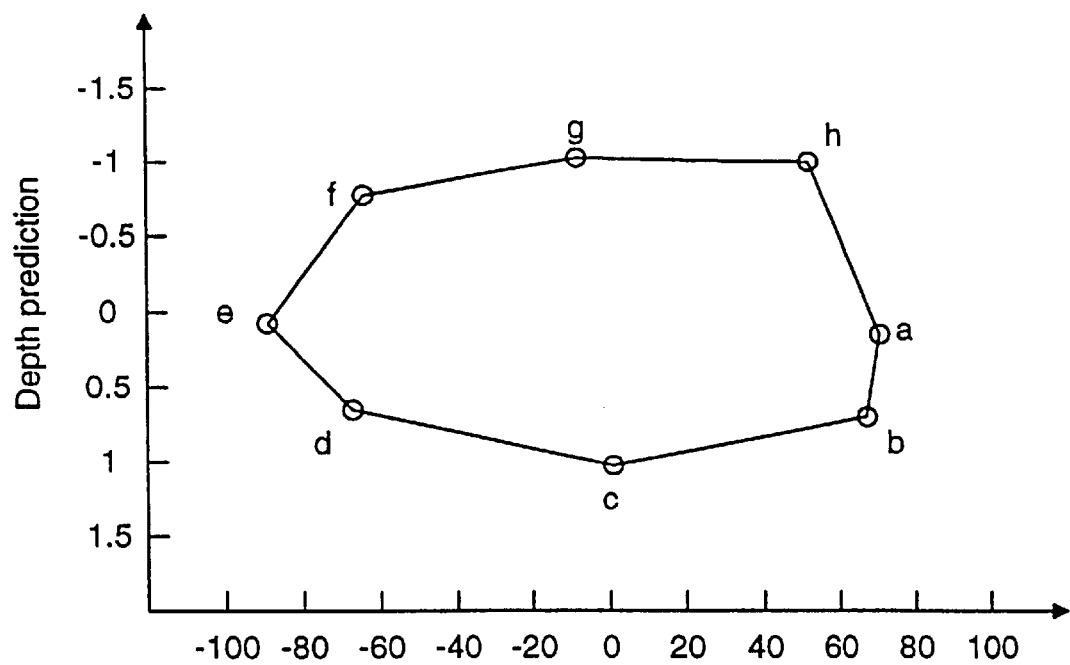
FIG. 7 is a plot of the results from FIG. 6.
Figure 7:
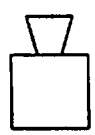

FIG. 7 shows the predicted depth from the left part of FIG. 6f plofted against the predicted horizontal position from the right part of FIG. 6f for frame 1. The figure shows quite regular circular shape quantitative estimates for depth. Observe that this result has been reached in spite of the fact that the input depth information merely consisted in qualititative local pairwise occlusions data, together with horizontal positions. Also observe that this result was reached assuming some errors in the occlusion list.

As a conclusion, in cases where auxiliary, relevant information is available, this may be included in the depth modelling to compensate for noise or inadequacies in the occlusion data, or for increasing the precision of the quantitative depth estimates.

The method extends directly to data from 2D cameras. One method for this is to perform the local motion and occlusion analysis in 2D instead of 1D. The resulting list of points can then be represented as a vector like described in FIG. 6c, and instead of just augmenting the occlusion list with the horizontal positions like in the right part of FIG. 6c, it can be further augmented with vertical positions.

It should be noted that other methods than principal component analysis may be used in this invention. For instance, instead of joint principal component analysis one may use a different factor analytic method, such as PLS2 regression with similar iterative missing value estimation. PLS2 regression is described in "Multivariate Calibration", pp. 146–165, H. Martens and T. Naes, John Wiley & Sons, 1991, which is hereby included by reference. Another alternative is multidimensional scaling (A. Gifi (1990): Nonlinear multivarate analysis. J. Wiley & Sons, Chichester UK, chapter 8, which is hereby included by reference).

Alternative methods for handling missing values in bilinear modelling, are given by A. Gifi (1990): Nonlinear muitivariate analysis. J. Wiley & Sons, Chichester UK, chapters 2.4, 3, 4 and 8, and in Lingoes, J. C., Roskam, E. E. and Borg, I. (1979) Geometric representations of relational data, Mathesis Press, Ann Arbor, Michigan, USA, and in Martens and Naes (1989, referenced above) p 158, which are hereby included by reference. Optimal scaling versions of bilinear modelling are described in A. Gifi (1990), Lingoes et al (1979), referenced above, and in "The principal components of mixed measurement level multivariate data: An alternating least squares method with optimal scaling features", Young F. W., Takane, Y. and De Leeuw, J., 1979, Psychometrika 43 (2) pp. 279–281, which is hereby included by reference. A slightly different technique is found in "Nonmetric common factor analysis: An alternating least squares method with optimal scaling features", Takane, Y. and Young, F. W., 1979, Behaviormetrica 6, pp. 45–56, which is hereby included by reference.

Since all these methods have the same function, from the present invention's perspective, of yielding factors describing the depth order, they are in the following referred to collectively as Principal Component Analysis or PCA.

The depth and occlusion information from the Depth Model Generator may be fed back into the Local Occlusion Detector for verification or enhancement.

Thereby the effect of spuriously erroneous interpretations of occlusion can be reduced. For instance, in a certain frame, say frame n, occlusions are expected near the positions where occlusions had been predicted based on frames 1, 2, . . . , n—1. Hence, uncertain occlusion information near the predicted occlusions is interpreted as representing occlusions, and uncertain occlusion information far from the predicted occlusions is interpreted as not representing occlusions.

SECOND PREFERRED EMBODIMENT

In the first preferred embodiment, a system according to the present invention was presented as applied to individual image points. The method of the first preferred embodiment can also be applied to image objects, in that an object consists of pixels or other primitives and each pixel or primitive can be used as a "point". But in the case when only one depth value for each object is wanted, as opposed to one depth value for each pixel in each object, then the computational demands for the process can be significantly simplified by applying most operations to a low number of objects instead of a high number of pixels.

There are methods for partitioning images of a sequence into objects. One such method is described in Wang & Adelson, already mentioned above. An object, there called a layer, is defined as a collection of pixel values collected from one or more frames, together with a so-called alpha map that indicates how intransparent each pixel is. For each frame and for each object, an affine transform is then computed, indicating how the pixels inside the non-zero part of the alpha map should be moved in order to reconstruct the pixels of the given object in the given frame. Since the "stiff" affine transform model is assumed for the objects, and since robust motion estimation and regression methods are used, motion for objects can be estimated also when there is some overlap between objects in some frames.

Figure 8:
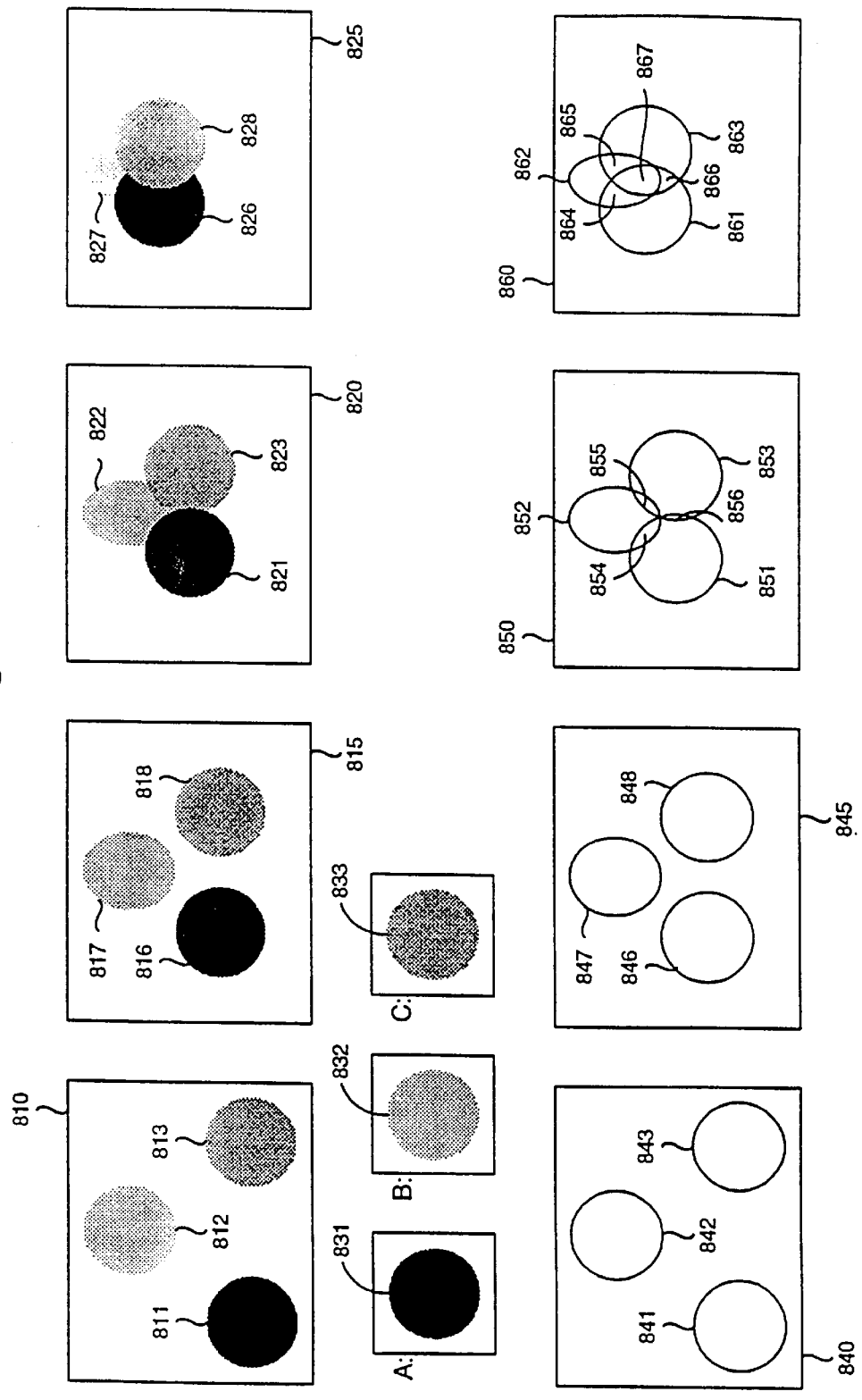
FIG. 8 illustrates the principle of the current invention as applied to objects instead of single points, collecting occlusion matrices from the regions where objects overlap.

An example of the principle of the present invention in its second preferred embodiment is now described with reference to FIG. 8. An original sequence consisting of four frames 810, 815, 820, 825 is given as input. Three objects 811, 812, 813 move towards each other until they finally overlap heavily 826, 827, 828.

In the following, the background behind the three objects will for simplicity not be considered, but it could have been taken into this example just like another object.

In the example, the objects have intermediate positions 816, 817, 818 before they start to overlap, so that sufficient information for motion estimation and segmenting is available, which means that an optimal system can be able to segment the objects well. The resulting objects can be extracted and represented as separate images 831, 832, 833. The intensities of these extracted object images can be direct intensities collected directly from one of the frames, or they can be result of robust operations like mean or median filtering over several frames, like done in Wang & Adelson already mentioned above. Alternatively, the intensities can be represented by a multi-factor model, like in WO 95/08240, which is hereby included by reference.

Motion estimation for the visible parts of the objects can be performed by some robust method, e.g. as described in Wang & Adelson already mentioned above. Based on this estimation, reconstructions 841, 842, 843, 846, 847, 848, 851, 852, 853, 861, 862, 863 of the silhouettes can be made. For making such reconstructions, the intensities of the objects must be moved, according to their motion estimates and their reference silhouettes. For methods for moving images, see "Digital Image Warping", third edition, G. Wolberg, IEEE Computer Society Press, 1994, which is hereby included by reference.

The areas where these silhouettes overlap 854, 855, 856, 864, 865, 866a re computed. The intensities of the corresponding parts of the original frames 810, 815, 820, 825 can now be compared with the intensities in the parts of the extracted objects 831, 832, 833 that correspond to these overlap regions.

The objects can be compared in reference position, that is, for each object, the part of the original image that corresponds to the overlap region can be moved back to the reference position coordinates of the object, and then the intensities can be compared, e.g. by computing a sum of absolute value of difference, sum of squared difference, or some other measurement of similarity, over the pixels.

Alternatively, the objects can be compared in frame position, that is, the object can be reconstructed using its estimated motion, and then the intensity differences can be computed between the original frame and the reconstruction.

When objects A and B move so that they overlap, then the difference between A and the original in the overlap area can be seen as the residual assuming that A is in front of B. Equivalently, the difference between B and the original can be seen as the residual assuming that B is in front of A.

The notation "$\text{Res}_{A>B}$" will be used to refer to the residual assuming that A is in front of B, and "$\text{Res}_{B>A}$" will refer to the residual assuming that B is in front of A.

Now two methods will be given to summarize such residuals.

The first method of summarizing residuals can be seen as using the method of the first preferred embodiment directly on objects instead of points. The occlusion list 870 will have one column for each object. For the overlap zone between objects A and B, this will then result in an occlusion list entry that has +1 for the object with smallest residual, −1 for the object with largest residual, and a weight computed according to the difference between the residuals. This weight can be the difference between the residuals directly, or it can be the difference between the residuals relative to the smallest or largest of the residuals, or it can be a statistical probability based on an F-test or similar.

The procedure for estimating a depth order for all objects is then the same as in tne first preferred embodiment, except that the objects are considered instead of points. e.g. each column of the incidence matrix now refers to an object.

The second method for summarizing residuals is based on topological sorting. One object can be seen as a node in a graph. The assumption that object A is in front of object B with a corresponding probability P can be seen as an edge from A to B with a corresponding strength P. This structure can be represented as an incidence matrix, as defined e.g. in "Introduction to linear algebra", G. Strang, pp. 339–348, Wellesley-Cambridge Press, 1993, which is hereby included by reference.

FIGS. 11*a–e* illustrate how various cases of overlap can be represented as depth graphs. The background is not considered in the example, though all principles that are used for the three objects can be further applied to the background.

Figure 11:
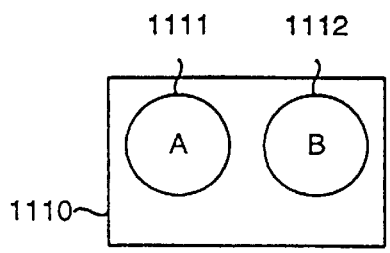
FIGS. 11a–f illustrate how to regard the occlusion matrices as graphs with possible loops, how to force these graphs into loopfree graphs, and how the result looks like when the graph has been converted into a depth order and into depth pair relationships respectively.
Figure 11:
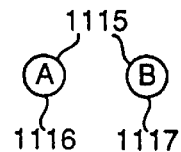
Figure 11:
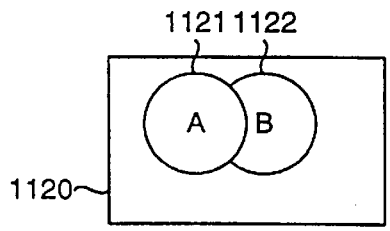
Figure 11:
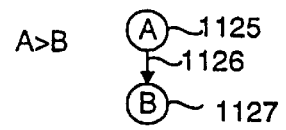
Figure 11:
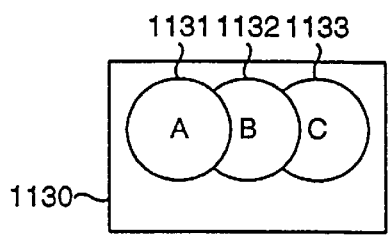
Figure 11:
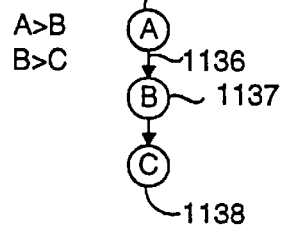
Figure 11:
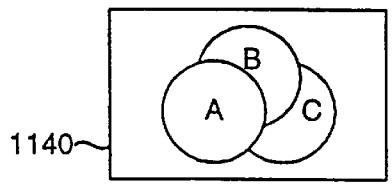
Figure 11:
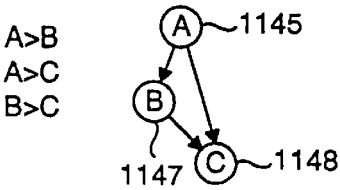
Figure 11:
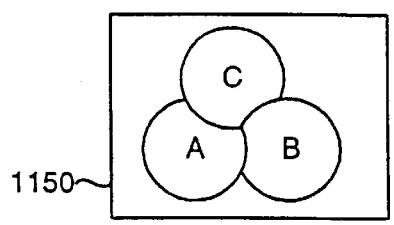
Figure 11:
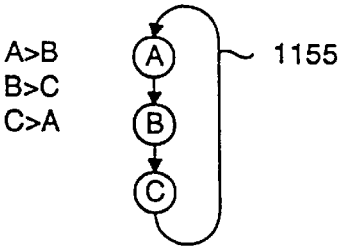
Figure 11:
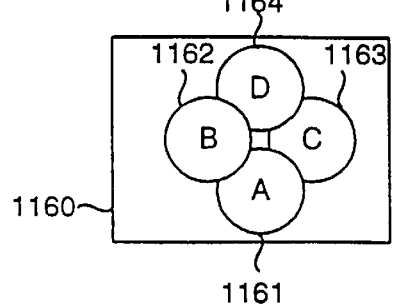
Figure 11:
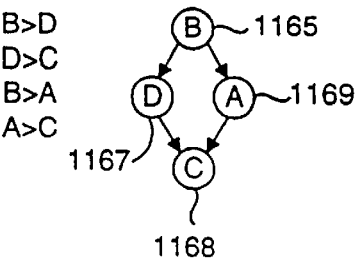

FIG. 11*a* shows two objects A 1111 and B 1112 that do not overlap in a given frame 1110. The depth graph 1115 for the objects consists only of two isolated nodes 1116, 1117. For many applications, this is valuable information. E.g, in an image decoder, the objects can be decoded independently, without extra processing like Z-buffering, for overlaps.

FIG. 11*b* shows the basic case of two overlapping objects A 1121 and B 1122 in a frame 1120. They overlap in one region, where it can be found that A is in front of B, A>B. The depth graph 1126 shows object A 1125 in front of object B 1127.

FIG. 11*c* illustrates, in a frame 1130, one object A 1131 that occludes another object B 1132 that again occludes a third object C. 1133 A 1131 occludes C 1133 only indirectly, which is reflected in the depth graph 1136 in that there is no direct edge (arrow) from A 1135 to C 1138.

FIG. 11d illustrates that there may be combinations of indirect overlaps, like in FIG. 11c, and direct overlaps.

FIG. 11e shows three objects A 1151, B 1152. C 1153 that occlude each other in a pattern that is not consistent with one specific depth order. In the depth graph 1156, this is reflected by a loop. In many real sequences, some of the found occlusions will correspond to physically "correct" overlaps, while other found occlusions will come from camera noise, imperfections in motion estimation, or other types of errors. In advance, it is not known which occlusions are "correct" and which are "false". In many real examples, the "false" occlusions will have a tendency to create inconsistencies in the depth order, corresponding to loops in the depth graph. On the other hand, occlusions corresponding to such errouneous occlusions will often have a tendency to be less systematic over time, or seem to include fewer pixels, or give rise to weaker intensity differences, than the "correct" overlaps. It is therefore advantageous to collect all available data about occlusions, and then find which occlusions must be disregarded in order to achieve one consistent depth order.

FIG. 11f shows a frame 1160 with four objects. Object B 1162 occludes object A 1161 and D 1164, while object A 1161 and D 1164 further occlude object C 1163. This is consistent both of the depth orders B>A>D>C and B>D>A>C. This indepenedece between A and D is valuable for the same reasons as explained for FIG. 11a, though the impact from the frontmost object B 1162 on both A 1161 and C 1163 must be considered.

Topological sorting is then the task of finding a total ordering, in this case a depth ordering, that is consistent with partial ordering, in this case occlusions. Such a topological sort is implemented as the program "tsort" in the UNIX operating system. A description of "tsort" is described in a man-page in the UNIX-version Solaris 2.4, which is hereby included by reference.

A basic topological sorting system like "tsort" does not work when there are loops (in the tsort man-page called "cycle") in the input data. Loops in the input data can be caused by camera noise or other sources of erroneous data, by accumulating occlusions over a sequence of frames where the depth order changes, by suboptimal results from motion estimation or other parts of the local occlusion detection, or by objects that actually occlude each other mutually.

In any case, such loops must for many applications be resolved. In one preferred embodiment, this is done by removing edges with low strengths in the occlusion graph until a loopfree graph is found. The combination of removing loops and topological sorting can be called robust topological sorting.

In one preferred embodiment, the removing of loops can be done according to the following pseudo-code:
  While a Loop can be found in the graph:
    Find the Edge in the Loop with smallest strength
    Set the strenath of the Edge to zero
Finding a loop in a graph can be done by several standard methods, like width-first search, or by exponentiation of a corresponding connectivity matrix.

Such removal of edges can be combined with threshold on edges: Before, during, or after the removal of edges according to the above pseudo-code, strengths smaller than a given threshold can be set to zero.

An incidence matrix representing such a graph can be given for one frame. Alternatively, the incidence matrices of several frames can be summarized by simply concatenating their incidence matrices. When several observations of a combination of objects occluding each other are made, they can be combined into one line in the incidence matrix, e.g. by adding their strengths, for the case of strengths represented as being proportional to residuals, or by multiplication, for the case of strengths being represented as probabilities.

When the loops in the occlusion data are caused by noise or spurios false results from other subsystems, and these effects manifest themselves in less certain occlusions than the "correct" occlusion, then the above procedure will have the effect of removing noise.

When the loops are caused by changing depth order during a sequence, or by objects that actually occlude each other mutually, then the above procedure will have the effect of breaking up such a loop as gently as possible.

In applications where the depth order is allowed to change during the sequence but where the depth order must be loop-free for any given frame, the removal of the loops can be performed for each frame.

Consider the following example: An sequence encoder analyses a sequence and finds that there is a changing depth order, which can only be modelled well with a multi-factor bilinear model of depth. It tries to use the above method to remove loops, using a low threshold on the certainity of occlusions, such that only insignificant occlusions will be disregarded in the process. This will in general lower the number of factors necessary in the bilinear depth model. The bilinear model is then transmitted to the decoder.

The non-zero edges in the graph now represents the depth graph. They can be output as an incidence graph, list, or an other suitable format.

The principle for computing residuals that give rise to occlusion matrix information that was shown above for overlap zones including two objects can be extended to be valid for any higher number of overlapping objects. In FIG. 8, there is one such zone 867 where three objects are involved.

Figure 9:
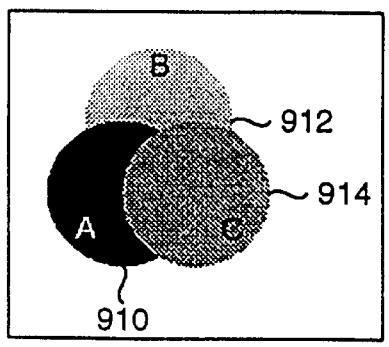
FIGS. 9a–e illustrate how collecting occlusion information can be done when three or more objects overlap.
Figure 9:
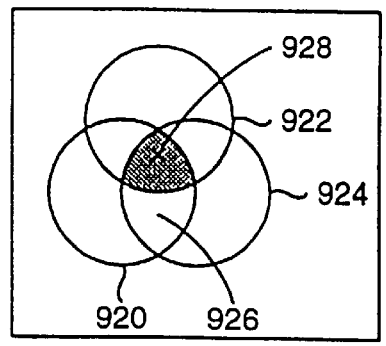
Figure 9:
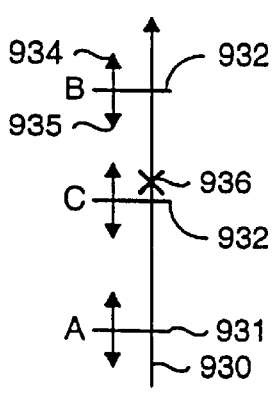
Figure 9:
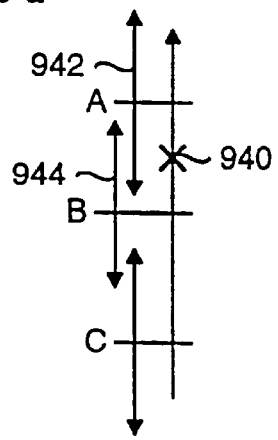
Figure 9:
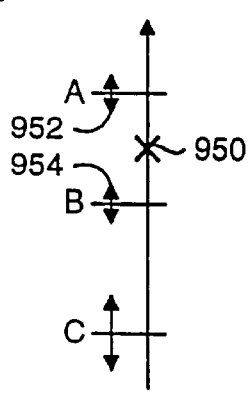

This is shown in more detail in FIGS. 9a to 9c. Three objects 910, 912, 914 overlap, such that their reconstructed silhouettes 920. 922. 924 coincides in an area 928.

FIG. 9c shows values for one pixel position 928 in the zone where the three objects A 910, 920, B 912, 922 and C 914, 924 overlapped as illustrated in FIGS. 9a and 9b. On an intensity scale 930, reconstructed pixel values A 931, B 932, and C 933, resulting from decoding of the three different objects in a given pixel position respectively, are shown, together with the intensity 936 of the corresponding pixel from the original image frame. The reconstructed pixel values also have uncertainties, e.g. for pixel A 931, there is an upper 934 and lower 935 limit for which intensity values can be assumed to this pixel. This uncertainty can be estimated from many sources: It can be given by camera characteristics, like ternal noise level. It can be based on other limitations in the imaging system, like quantization necessary to digitize, store, compress, or otherwise process. It can be based on statistics for the object or for the pixel position based on earlier frames. Or it can be defined by a relaxation parameter in a process that has depth estimation as one part, together with e.g. motion estimation and segmenting, and uses a relaxation parameter in its module for depth estimation in order to focus first on the main, certain information and then as the later on details.

In the example given in FIG. 9c, the original pixel value 936 is inside the uncertainity limits 934, 935 for reconstructed pixel value C, while it is outside the uncertainites for B 932 and C 933. It can therefore be concluded that the reconstructed pixel value C fits with the given data, while A and B do not. Since A, B and C correspond to the same pixel position in a frame, but three different objects, this means that this observations support the hypothesis that the visible pixel is a part of C, which further implies that C is in front of A and also that C is in front of B. Note, however, that this observation has little information value regarding the ordering of B and C. The conclusion for this example is therefore C>A and C>B, with corresponding strengths based on differences like discussed earlier. Therefore, $Res_{C>A}$, $Res_{C>B}$, $Res_{A>C}$ and $Res_{B>C}$ can be used to update the occlusion list.

In the example given in FIG. 9d, the pixel value 940 is inside the uncertainties for two different objects A and B, while it is outside the uncertainty of a third object C. This pixel therefore supports that either A or B, or both, are in front of C. A>C or B>C. In this preferred embodiment, this or-relationship is handled similarly to the and-relationship in previous paragraph, in that $Res_{A>C}$, $Res_{C>A}$, $Res_{B>C}$ and $Res_{C>B}$ can be used to update an occlusion list.

FIG. 9e shows yet another case, where the observed pixel intensity 950 is outside all the allowed ranges for the pixels of the objects. In this case, no conclusion about occlusions can be found.

The above process can be summarized in the following pseudo-code:

For each pixel position in the overlap zone:
  For each object involved in the overlap:
    Reconstruct pixel value corresponding to the pixel, together with allowed range
    If the observed pixel fits inside the allowed range:
      Mark the object as Allowed
    else
    Mark the object as NotAllowed
  For each Allowed object:
    For each NotAllowed object:
      Accumulate $Res_{Allowed>Not\ Allowed}$ in the occlusion matrix according to difference between observed and reconstructed pixel values This method takes a rather hard yes/no-type of decision for each pixel, in that each pixel is either allowed or not allowed. For many applications, this is sufficient, in that the number of pixels is so large that the total output appears to be a continuous function of motion etc. When the above method is not sufficient, then a refinement is possible. Rather than using the incertainities as thresholds for allowed or not, they can be used to produce different degrees of allowability. In FIG. 9c, this could mean that since the observed pixel value 936 is very close to the reconstructed pixel value a 931, then pixel a could have an allowability very close to 1. In FIG. 9e, the observed pixel value 950 could have zero allowability for each object, while the observed value 940 in FIG. 9d could have an intermediate value. The residuals are then be multiplied with this allowability before being accumulated into the occlusion matrix. This corresponds to a type of fuzzy logic.

In the preceeding, occlusions have been used as source for depth information. Innovations can be seen to be the same phenomenon as occlusions, only with a change of time axis, and thereby all the principles given so far can be applied directly.

Figure 10:
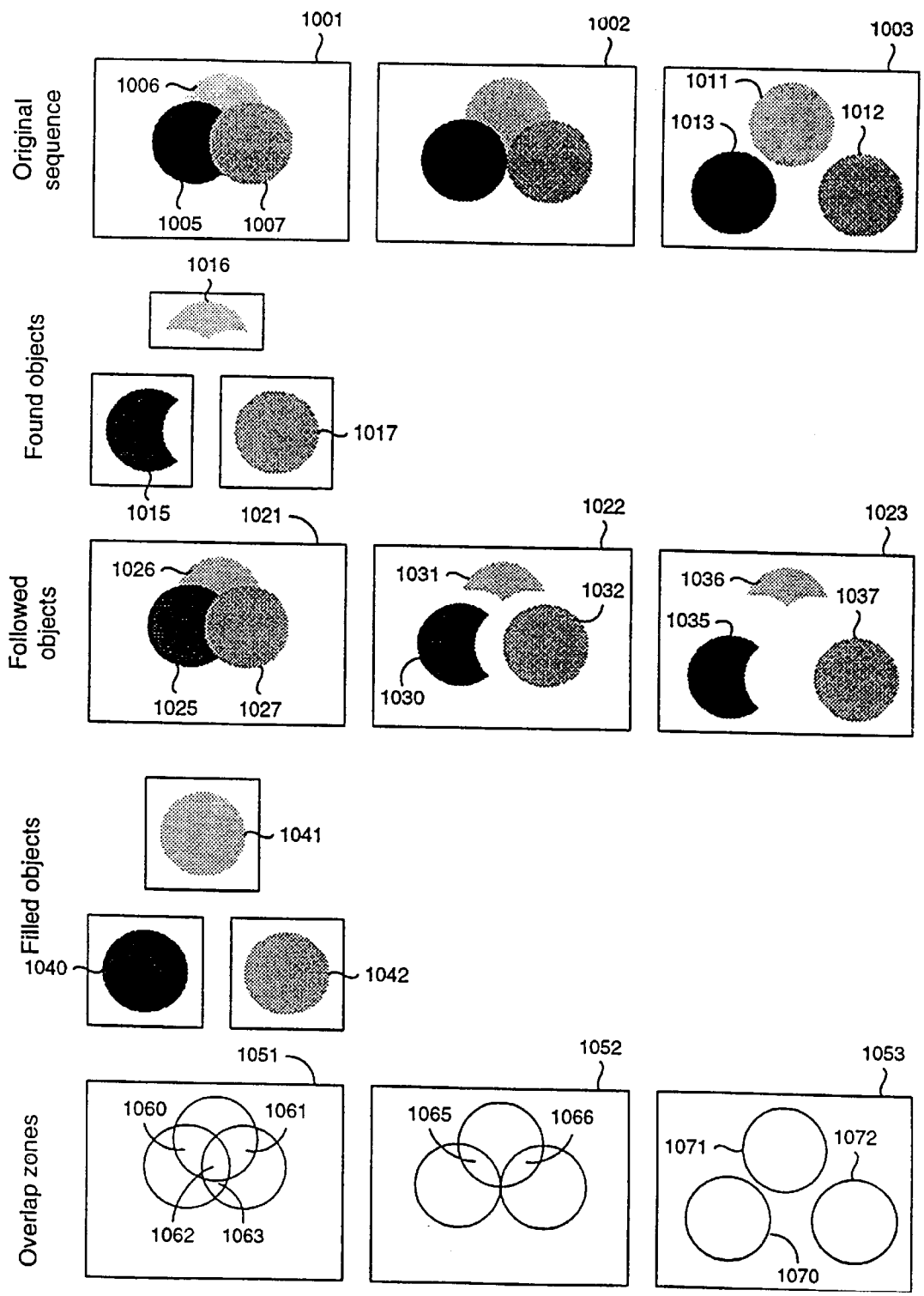
FIG. 10 illustrates how the method can be applied for innovation areas instead of occlusion areas.

Alternatively, for application where the direction of time is important, refer to FIG. 10. Three frames 1001, 1002, 1003 in a sequence contain three objects 1005, 1006, 1007 that initially occlude each other, but then move away so that new areas of the objects, called innovations, become visible. Assume that the partition into objects is based on the first frame 1001, resulting in initial found objects 1015, 1016, 1017 which are yet less than complete because of the occlusions. Still, the found objects can be followed through the frames, resulting in initial positions 1030, 1031, 1032. 1035,1036.1037 for the objects. The parts of the original frames 1001, 1002, 1003 that are not covered by the reconstructions 1021, 1022, 1023 can now be assigned to the found objects 1015, 1016. 1017, e.g. by a method based on the following principle.

While there are uncovered pixels in some frame of the sequence:
  Select a reference frame, e.g. the one with largest amount of Vet uncovered pixels
  For each uncovered pixel in the reference frame:
    For each object that is close in the reference frame:
      For each other frame of the sequence:
        Find which pixel of the other frame corresponds to the pixel of the reference frame, using motion extrapolated from the object
      Collect statistics, like mean and standard deviation of pixel values
    Assign the pixel to the object that had the best statistics, e.g. smallest standard deviation The innovations assigned to objects by this procedure give rise to occlusions and can therefore be used to estimate depth. To do this, reconstruct the silhouettes of the final objects based on their estimated motion for each frame, find their overlap zones 1060, 1061, 1062, 1065,1066, and proceed as explained for FIG. 8.

Figure 12:
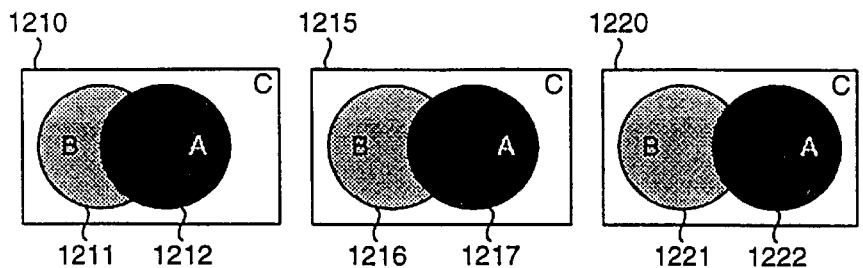
FIGS. 12a–c illustrate prediction of occlusion matrices.
Figure 12:
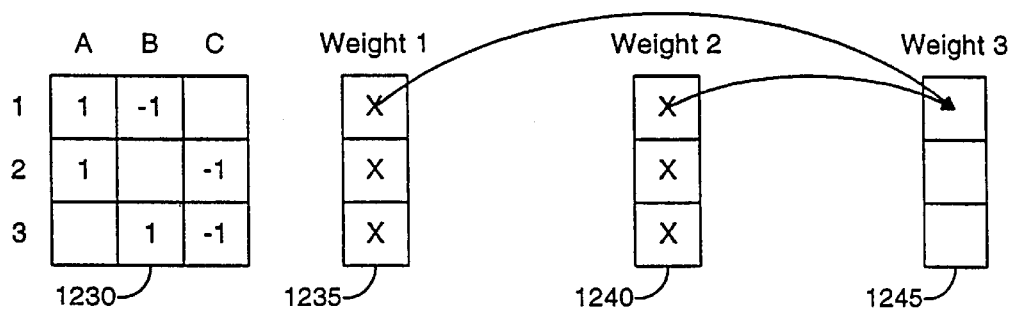
Figure 12:
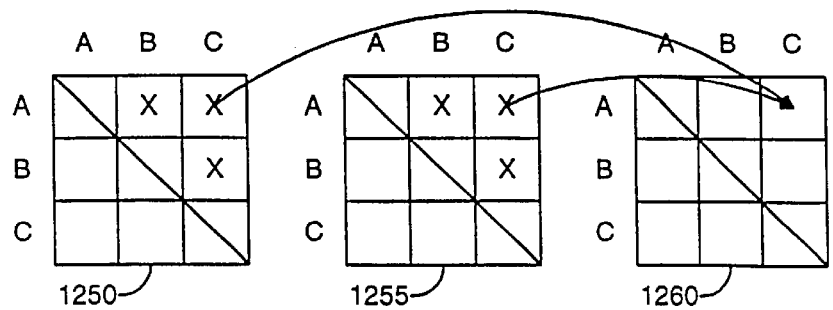

Incidence matrices can be forecast, as shown in FIGS. 12a–c. When incidence matrices are known for some frames in a sequence, e.g. the first two frames 1210, 1215 of the sequence shown in FIG. 12a, then an incidence matrix for another, related frame, e.g., the third frame 1220 of the sequence in 12a. can be made using e.g. linear interpolation, when the frame is between two frame for which the incidence matrix is known, or extrapolation, when the frame follows one or more frames for which the incidence matrix is known. An example of this is given in FIG. 12b. First, one common structure must be chosen for the occlusion list, so that the results from several frame can be compatible. The chosen set of occlusion in the common occlusion list 1230 contains entries for A>B in first row, A>C in second row, and B>C in third row. In this example, the residuals have been used to compute weights for the occlusion; the weights are based on residuals as described above. Weights 1235,1240 for the two first frames 1210, 1215 can so be used to predict, by interpolation or extrapolation, the weights for the next frame. These can so be basis for finding and resolving inconsistencies.

FIG. 12c illustrates an equivalent data structure. Instead of a occlusion list, having one column for each object and one row for each observation or summary of observations of one occlusion pattern, an occlusion matrix 1250 has one row and one column for each object. A value x in position i,j in an occlusion matrix then means that object i occludes object j with a strength of x, where the strength can be a weight, difference of residuals, probability, confidence etc. as described above. Each element in one occlusion matrix 1260 can then be predicted from corresponding elements of other occlusion matrices 1250,1255.

The prediction according to FIG. 12b or 12c can also be done using multivariate techniques. The weights 1235,1240 of FIG. 12b can be modelled by a bilinear model so there is one set of scores for each frame, this or these scores can be predicted, and a prediction for the weights can so be found by multiplying scores by loadings. The method is the same for occlusion matrices as outlined in FIG. 12c, except that the strengths must be formatted into row vectors before the bilinear modelling and reconstruction must be formatted back into a matrix.

Another combination of bilinear modelling and inconsistency resolving is the following:

An encoder can collect incidence matrices corresponding to several frames. These can be aligned, so that occlusions between two given objects always occur in the same positions. It is then possible to perform a bilinear modelling of these matrices, resulting in temporal scores and spatial loadings. The bilinear model does not need to be free of inconsistencies for each frame. This bilinear model can be transmitted from the encoder to a decoder. Inconsistencies in the reconstructed occlusion list entries for each frame, found by multiplying scores by loadings, can then on the decoder side be found and resolved for each individual frame.

While the invention has been particularity shown and described with reference to the preferred embodiments thereof, it will be understood by those skilled in the art that various changes in form and detail may be made therein without departing from the spirit and scope of the invention. Thus the term "plurality" may also be interpreted in the sense of "one or more".

What is claimed is:

1. A method for estimating depth in an image sequence consisting of at least two frames, wherein recognizable points are followed in the frames, wherein:

occlusion information, based on following recognizable points, is used to produce a bilinear model of depth, wherein the bilinear model comprises a score matrix and a loading matrix, the score matrix comprising column vectors called score vectors, the loading matrix comprising row vectors called loading vectors, the collection of one score vector, with a value for each frame, and one loading vector, with a value for each point, being called a factor, such that depth for each frame can be reconstructed by adding factor contributions from all factors, each factor contribution being the product of the score value corresponding to the frame and factor and the loading vector corresponding to the factor.

2. The method according to claim 1, the method comprising the steps of:

(1) selecting and characterizing the recognizable points, (2) examining for each point in each frame whether it is visible or occluded, collecting this occlusion data in an occlusion list such that each frame corresponds to one row in the list and each point corresponds to a column in the list, such that elements in the list corresponding to visible points are given large values and elements in the list corresponding to occluded points are given small values, (3) performing a bilinear modelling on the occlusion list, and (4) outputting the numerical value of each element of the loading vector of the first factor as depth information on the corresponding point, where a large numerical value indicates a point close to the camera or observer and a small numerical value indicates a point farther away.

3. The method according to claim 1, the method comprising the steps of:

(1) selecting and characterizing recognizable points, (2) examining for each point in each frame whether it is visible or occluded, collecting this occlusion data in an occlusion list such that each observation of occlusion corresponds to one row in the list and each point corresponds to a column in the list, and such that occluded points are given small values, occluding points are given large values, and the remaining points are marked as missing values, (3) performing a bilinear modelling on the occlusion list, using a method capable of handling missing values, and (4) outputting the numerical value of each element of the loading vector of the first factor as depth information on the corresponding point, where a large numerical value indicates a point close to the camera or observer, a small numerical value indicates a point farther away, and a missing value indicates a point that can have any depth.

4. The method according to any one of claims 1 to 3, wherein the occlusion list also comprises, for each point, one column for each of the coordinate dimensions of the image, the columns containing the coordinates for the point in each frame.

5. The method according to any one of claims 1 to 3, wherein the image sequence consists of at least three frames, wherein a number of relevant factors is chosen, such that the number is greater than or equal to 1, but smaller than or equal to the number of frames in the sequence, and only the part of the score and loading matrices corresponding to the number of relevant factors is used for producing an estimate of depth.

6. The method according to any one of claims 1 to 3, wherein video objects are used instead of recognizable points.

7. A method for estimating depth according to any one of claims 1 to 3, wherein video objects are in a sequence consisting of at least two frames, wherein the depth of each video object is found by computing a representative depth value for the object based on the depth values for the points inside the video object.

8. A method for estimating depth dependencies in a sequence consisting of at least two frames, the method comprising the steps of:

(1) defining and characterizing recognizable objects, (2) estimating motion for each object in each frame, (3) aggregating occlusion data in an occlusion matrix that has one row for each object and also one column for each object, such that when a first object with number A and a second object with number B have such motion that they overlap in a frame, then object A is reconstructed for the frame, an indicator of difference between reconstruction and original is computed, and the result is accumulated in position (A,B) in the occlusion matrix, then object B is reconstructed for the frame, an indicator of difference between reconstruction and original is computed, and the result is accumulated in position (B,A) in the occlusion matrix, (4) transforming the occlusion matrix into a graph, where each object is transformed into a node, and each non-zero element of the occlusion matrix is transformed into an edge from the node associated with the row of the element to the node associated with the column of the element, with the numerical values from the occlusion matrix as edge strength, (5) detecting and resolving any loops in the graph such that the weakest edges are removed, wherein the remaining edges in the graph represent depth dependencies between the objects in the sequence.

9. The method of claim 8, wherein step (3), the elements (A,B) and (B,A) of the occlusion matrix are computed using a motion estimation from the frame with overlap back to a frame without overlap between the objects A and B, such that the values to be accumulated to (A,B) and (B,A) are dependent on whether the motion estimation in the overlap area points to object A or B in the non-overlapped frame.

10. A method for predicting depth dependencies for a frame being part of a sequence of at least three frames, the method comprising the steps of:

(1) computing an occlusion matrix according to step (3) of claim 9 for each of the frames in the sequence except said frame, (2) predicting, by interpolation or extrapolation, the individual elements of the occlusion matrix for the wanted frame, (3) computing depth dependences based on the predicted occlusion matrix, using the steps (4)–(5) of claim 9, wherein the remaining edges in the graph represent depth dependencies between the objects in said frame.

11. An apparatus for estimating depth in an image sequence consisting of at least two frames, the apparatus comprising:

(1) a means for selecting and characterizing recognizable points, (2) a means for examining for each point in each frame whether it is visible or occluded, collecting this occlusion data in an occlusion list such that each frame corresponds to one row in the list and each point corresponds to a column in the list, and such that elements in the list corresponding to visible points are given large values and elements in the list corresponding to occluded points are given small values, (3) a means for performing a bilinear modelling on the occlusion list, resulting in a score matrix comprising column vectors called score vectors and a loading matrix comprising row vectors called loading vectors, the collection of one score vector, with a value for each frame, and one loading vector, with a value for each point, being called a factor, such that one row of the occlusion list can be reconstructed or approximated by adding factor contributions from all factors, each factor contribution being the product of the score value corresponding to the frame and factor and the loading vector corresponding to the factor, and (4) a means for outputting the numerical value of each element of the loading vector of the first factor as depth information on the corresponding point, where a large numerical value indicates a point close to the camera or observer and a small numerical value indicates a point farther away.

* * * * *